Dec. 7, 1971   N. DAVIS   3,625,002
ELECTRICAL ACTUATOR
Filed Oct. 21, 1969
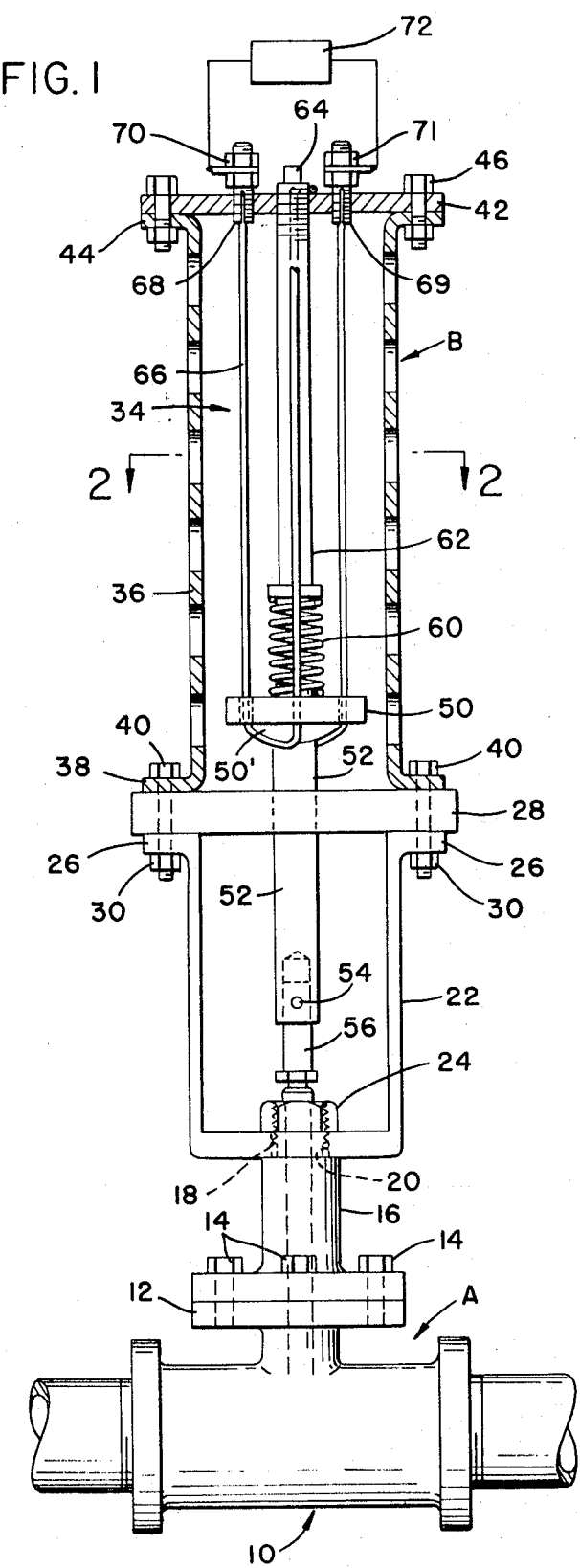
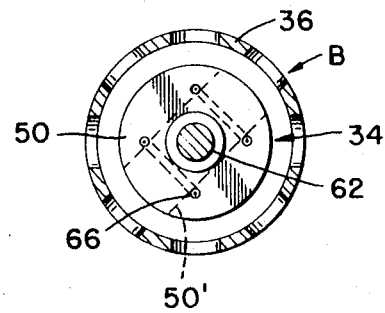
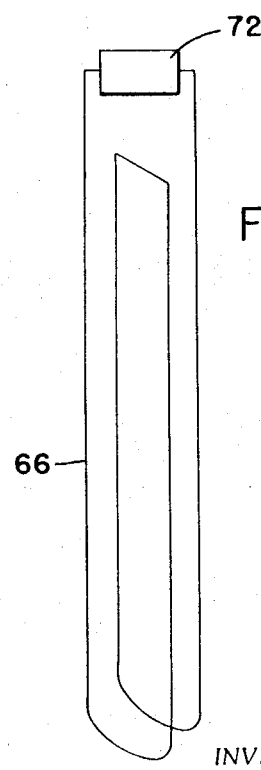
INVENTOR.
NOEL DAVIS
BY
Meyer, Tilberry & Body
ATTORNEYS

United States Patent Office 3,625,002
Patented Dec. 7, 1971

3,625,002
ELECTRICAL ACTUATOR
Noel Davis, Russell Township, Geauga County, Ohio, assignor to Integrated Development and Manufacturing Co., Chagrin Falls, Ohio
Filed Oct. 21, 1969, Ser. No. 868,115
Int. Cl. F03g 7/06; F16k 31/02
U.S. Cl. 60—23
7 Claims

ABSTRACT OF THE DISCLOSURE

The drawings disclose an electrical actuator for valves, controls, and the like. The actuator shown comprises a drive plate adapted to act against a driven member. The drive plate is continuously biased in a first direction by an adjustably mounted spring. At least one elongated resistance wire member is connected with the plate to act against the spring. Additionally, means are shown for supplying electric current to wire member to cause it to expand or contract to produce controlled movement of the drive plate.

---

The present invention is directed toward the art of electrical actuators and, more particularly, to an actuator assembly wherein movement of all of the assembly's parts can be simple straight line motion.

The invention is particularly suited for use in producing high force, short distance movements for actuating control valves and the like and will be described with reference thereto; however, as will be appreciated, the invention is capable of much broader application and could be used for many different applications.

Electrically controlled, motor actuated valves are widely used in many types of processes. Similarly, valves actuated by differential expansion of solids or fluids in conjunction with controlled heating elements are also often used.

Both of the noted types of actuators are well suited for certain specific uses; however, where the requirement is for rapid response together with movement of short distance and high force, both types have serious drawbacks. For example, in addition to having a high first cost, the electrically controlled, motor actuated units are generally unsatisfactory since they normally include gears, cams, and similar elements in their drive train. Any wear in the drive train tends to result in substantial variation in the output or control movement. With regard to the differential expansion type, the problems, among others, are slow response, low force output, and general inaccuracies.

The present invention overcomes the above problems and provides an actuator that is extremely simple and inexpensive. Actuators formed in accordance with the invention are especially suitable for producing high force outputs of relatively short and closely controllable distances. Further, the invention also allows the actuators to be constructed without rotating elements or elements likely to wear and result in control inaccuracies. According to the invention, the actuator includes a first frame member and a movable drive member spaced from the frame member. A biasing means is provided to continuously bias the drive member away from the frame member. Connected between the frame member and the drive member to counteract the biasing means is an elongated, wire means adapted to expand and contract when electric current is supplied thereto. Preferably the wire means includes at least one resistance wire such as Nichrome.

In accordance with a more limited aspect, the wire means includes at least one resistance wire which has its opposite ends connected to the frame member and its central portion engaged with the drive member. Additionally, the biasing means is preferably a compression spring acting between the frame member and the drive member to continuously bias the drive member against the wire means.

As can be seen, by controlling the supply of current to the wire, the internal heating of the wire will cause the wire to vary the movement of the drive member. Over the useful range of wire expansion and contraction, the current supplied and the resultant change in length of the wire are substantially directly proportional. Further, the wire is loaded only in tension with the spring serving to move the drive member during expansion. This allows the wire to be of a small diameter. Thus, because of its small mass and large surface area, the wire quickly cools when current is reduced thereby producing rapid response.

Accordingly, a primary object of the invention is the provision of an actuator that is simple and inexpensive to construct but which provides very rapid and accurate response.

Another object is the provision of an actuator of the type described that produces a rate of output movement that can be substantially directly proportional to the rate of current input.

A further object is the provision of an actuator wherein the power portion is a small mass and large surface area wire member continuously loaded under tension produced by a biasing member.

A still further object is the provision of an electrically controlled actuator of the general type described that can produce high force, short length movement which is directly proportional to current input.

Yet another object is the provision of an electrically controlled actuator wherein all elements move linearly with no wear points that can cause variation in performance throughout the life of the actuator.

These and other objects and advantages will become apparent from the following description when read in conjunction with the accompanying drawing wherein:

FIG. 1 is a longitudinal cross-section through the preferred embodiment of the invention;

FIG. 2 is a cross-sectional view taken on line 2—2 of FIG. 1; and

FIG. 3 is a pictorial view showing the arrangement of the wire member.

Referring more particular to the drawings wherein the drawings are for the purpose of illustrating the preferred embodiment of the invention only, and not for the purpose of limiting same, FIGS. 1 and 2 show the overall arrangement of a valve A operated by an actuator B formed in accordance with the invention. The valve A forms no part of the invention and has been illustrated merely for the purpose of showing one environment or use for which the actuator is especially adapted. The valve A is shown as having a body 10 from which extends a mounting flange portion 12 to which the actuator assembly B is removably connected in any convenient manner such as through the use of machine screws 14.

The actuator assembly B could take many specific embodiments and be supported and mounted from the associated driven assembly or member in many ways; however, in the preferred embodiment, the mounting arrangement comprises a flanged, sleeve-like member 16 which is directly connected to the flange 12 by the machine screws 14. The upper end of the sleeve-like member 16 is provided with a reduced diameter portion 18 which passes through an opening 20 formed in a bracket member 22. A nut 24 is received on the threaded upper end of the reduced diameter portion 18 and functions to firmly clamp the bracket 22 to the sleeve-like member 16.

The bracket member 22 is shown as a U-shaped metal frame which has outwardly extending flanges 26 formed at the upper ends of its legs. A circular metal plate 28 is releasably connected to the flanges 26 by bolts 40 and nuts 30. Extending upwardly from the circular plate 28 and functioning to support the power assembly 34 of the actuator is a perforated tubular member 36. The lower end of the member 36 is provided with an outwardly extending flange 38 that is releasably connected to the plate 28 by the bolts 40. At the upper end of the tubular member 36 is a first transversely extending frame or plate member 42 that is also connected to an outwardly extending flange 44 formed on the upper end of the sleeve member. This plate member 42 is preferably releasably connected in any convenient manner such as through the use of bolts 46.

Of particular importance to the invention is the power assembly 34. As can be seen in FIGS. 1 and 2, the power assembly 34 includes a drive member 50 which is directly connected to a rod or piston member 52 that is slidably guided through an opening in the plate member 28. Although not shown, the rod 52 can be provided with suitable slide bearings where it passes through plate 28. The lower end of the piston member 52 is releasably connected by a pin 54 with an actuating rod 56 that passes downwardly through the sleeve member 16 and into driving engagement with the valve element of the valve A. This arrangement permits movement of the drive member 50 to be transmitted to the valve element to cause a desired degree of opening or closing of the valve.

The drive member 50 is biased in a downward direction by biasing means shown as a relatively short, large diameter compression spring 60. The upper end of the compression spring 60 is engaged by a rigid rod or stud member 62 which has its upper end threadedly received in the first frame member 42. The outermost end of the rod member 62 is provided with wrench flats 64 which permit the member to be adjusted longitudinal of the frame to vary the force applied to the drive member by the spring 60. Additionally, the lower end of the stud member 62 is provided with a boss portion which engages the spring 60 to maintain it centered.

Connected between the drive member 50 and the first frame member 42 is at least one, elongated expansion member 66. In the embodiment under consideration, the expansion member 66 comprises an elongated, relatively small diameter section of Nichrome resistance wire. One end of the wire 66 passes through the plate or frame member 42 and is firmly clamped therein by a conventional compression clamp 68. As best shown in FIG. 3, the wire 66 passes down and about the curved lower portion 50' of the drive member 50 and then up through the plate 42. Thereafter, the wire passes back down through the plate and under the portion 50 and upwardly through the plate 42 to clamp 69. Although in the embodiment under consideration the wire 66 makes two loops as described, it is apparent that any number of the wires could be provided depending upon the force and distance output required. Additionally, the wires instead of passing simply under the member 50 could be directly connected to it and terminate in the plate 50.

Above the frame plate 42 and electrically connected to the wire 66 are terminals 70, 71 which are shown as being connected to a controller 72. Controller 72 forms no part of the invention and could be of any particular type. For example, if the power unit 34 is to respond to variations in temperature the controller 72 would be a temperature responsive element adapted to produce a variable current output in response to temperature changes. Similarly, by pulsing the current in predetermined patterns, the motion output can be made to conform to a desired movement program.

As is apparent, the current supply to the terminals 70, 71 causes the Nichrome wire to be heated dependent upon the current supplied. The wire 66 is, of course, electrically insulated from the drive plate 50 and the frame plate 42. In the embodiment under consideration, this insulation comprises a thin fiber glass sleeve which extends throughout the length of the wire 60. Obviously however, the same results could be achieved by making both the drive plate 50 and the frame member 42 from an electrically non-conductive material. As can be appreciated, by supplying the variable amounts of current to the wire 66 the heating of the wires and, accordingly, their expansion and/or contraction can be closely regulated to cause movement of the drive plate 50. Note that, when the wires 66 are not heated and are at ambient temperature, they are contracted and maintain the drive plate 50 in its uppermost position against the bias of spring 60; however, as current is supplied to the wire, the wire is heated. Consequently, the wires expand a proportional amount and permit the spring 60 to drive the plate 50 downwardly to actuate the valve member. Because of the small mass and small diameter of the wires the heating and cooling of the wires takes place very rapidly giving the actuator excellent response to variations and current.

To increase the rate of cooling, it will be noted that the sleeve member 36 is provided with a large number of openings throughout its length so that ambient air can freely circulate about the wires.

The amount of movement provided by the actuating assembly depends, of course, on the length of the wires and the current supplied thereto. By varying the length of the wires and/or the current supplied any of a wide range of movements can be provided. Additionally, although in the embodiment under consideration, an increase in the output movement required would require an increase in the overall length of unit it would be possible by the use of motion multiplying mechanisms to greatly increase the output movement without increase in the length of the overall assembly. These arrangements would be somewhat less desirable however because of the introduction of wear points which could cause variation in output during the life of the assembly.

Merely by way of example, in the embodiment of the subject device, the Nichrome wire is of .051 diameter and of a total length of approximately 40 inches. This produces a 0.05 inch movement variation with a 0 to 10 amp variation in 10 volt power. Additionally, this delivers a 200 lb. force over the stroke.

The invention has been described in great detail sufficient to enable one of ordinary skill in the actuator art to make and use the same. Obviously, modifications and alterations will occur upon the reading and the understanding of the specification. It is my intention to include all such alterations and modifications as part of my invention insofar as they come within the scope of the appended claims.

Having thus described my invention, I claim:

1. An electrical actuator comprising: a first frame member; a drive member spaced from said frame member and having a linear path of movement; biasing means for continuously biasing said drive member along said path away from said frame member; at least one, elongated resistance wire member connected between said first frame member and said drive member parallel to said path to counteract the force applied to said drive member by said biasing means; and, means for controllably supplying electric current to said wire member whereby said wire member is caused to heat and expand as current is supplied thereto to permit predetermined linear movement of said drive member along said path by said biasing means.

2. The actuator as defined in claim 1 wherein said biasing means includes a compression spring member positioned between said frame member and said drive member and having an axis coinciding with said path.

3. The actuator as defined in claim 1 wherein said biasing means is adjustable to vary the force applied to said drive member.

4. The actuator as defined in claim 1 wherein said wire member is looped about said drive member and has its opposite ends connected to said first frame member.

5. The actuator as defined in claim 1 wherein said wire member includes a plurality of sections extending in parallel between said drive member and said first frame member.

6. The actuator as defined in claim 1 wherein said biasing means is an adjustable coil spring having an axis coinciding with said path, and wherein said wire member includes a plurality of parallel sections extending parallel to said axis of said biasing means.

7. The invention as defined in claim 1 including a second frame member spaced from said first frame member, and housing means connected between said first and second frame members and enclosing said wire member, said drive member and biasing means.

References Cited

UNITED STATES PATENTS

| | | | |
|---|---|---|---|
| 2,787,118 | 4/1957 | Markham | 60—23 |
| 3,215,396 | 11/1965 | Bergsma | 251—11 |

MARTIN P. SCHWADRON, Primary Examiner

A. M. OSTRAGER, Assistant Examiner

U.S. Cl. X.R.

251—11